Patented Nov. 15, 1949

2,488,094

UNITED STATES PATENT OFFICE 2,488,094

DIIMIDAZOLES AND PROCESS OF MAKING SAME

Charles Graenacher, Riehen, and Franz Ackermann, Binningen, Switzerland, assignors to Ciba Limited, Basel, Switzerland, a Swiss firm No Drawing. Application March 9, 1945, Serial No. 581,964. In Switzerland December 23, 1942

9 Claims. (Cl. 260—240)

This is a continuation-in-part of our copending patent application Serial No. 515,024 filed December 20, 1943, now Patent No. 2,463,264.

It has been found that diimidazoles of the general formula

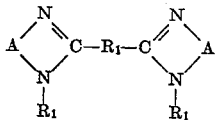

wherein A stands for a substituted or unsubstituted aromatic radical in which two vicinal carbon atoms are connected to the nitrogen atoms of the imidazole rings, $R_1$ stands for hydrogen or a substituent such as an alkyl or aralkyl radical, and $R_2$ stands for a bivalent radical containing at least one double bond and forming with the $>C=N$ double bonds of the imidazole nuclei an uninterrupted series of conjugated double bonds, are obtained by causing suitable aromatic ortho-diamines, if necessary in the presence of condensing agents, to react with aliphatic dicarboxylic acids containing double bonds in the $\alpha:\beta$-position, or with aromatic para-dicarboxylic acids, or with heterocyclic dicarboxylic acids containing the carboxylic acid groups in 2:5-position, or further with the functional derivatives thereof and, if necessary, causing alkylating agents or aralkylating agents to react on the diimidazoles thus obtained.

Among the aromatic ortho-diamines which are suitable as parent substances for the present invention may be mentioned diamines in which the one amino group is primary and the other primary or secondary. Such ortho-diamines are, for example, ortho-phenylene diamine, 1:2-naphthalene diamine, further isopropyl-o-phenylene diamine, 1-methoxy-3:4-diaminobenzene, 1-amino-2-monomethylamino-benzene or 1-chloro-3:4-diaminobenzene. In these diamines therefore, 3 to 4 hydrogen atoms are present to two nitrogen atoms.

Examples of the above mentioned dicarboxylic acids are: fumaric acid or maleic acid, muconic acid, terephthalic acid, monochloro-terephthalic acid, diphenyl-p:p'-dicarboxylic acid, further furane-dicarboxylic acid-(2:5), thiophen-dicarboxylic acid-(2:5). As functional derivatives of these dicarboxylic acids, the anhydrides or chlorides, such as maleic acid anhydride, fumaric acid dichloride, further fumaric acid dimethyl ester, may for instance be used.

In the above-mentioned unsaturated aliphatic dicarboxylic acids the $>C=O$ double bonds of the carboxyl groups form an uninterrupted chain of conjugated double bonds with the double bonds which are present in the chain separating the carboxyl groups. In the case of fumaric acid and maleic acid this system of conjugated double bonds corresponds to the formula

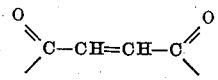

and in the case of muconic acid to the formula

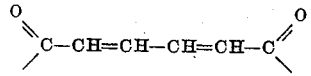

Maleic acid and fumaric acid are examples of $\alpha:\beta$-unsaturated aliphatic dicarboxylic acids.

If the above-mentioned dicarboxylic acids are used as parent substances the reaction with the aromatic diamines is preferably conducted by heating to about 120–200° C., i. e. until dehydration is complete, preferably with exclusion of air. Catalysts, such as boric acid, may then be used. Functional derivatives of the dicarboxylic acids described above generally react at a lower temperature.

If alkylation or aralkylation of the diimidazoles is desired, it may be effected in the usual manner, for example by treatment with alkyl or aralkyl halides, such as benzyl chloride, preferably with the addition of acid-binding agents. For the alkylation, dialkylsulfates, such as dimethylsulfate, may also be used.

One method of carrying out the present process consists in condensing, instead of the aromatic o-diamines, o-nitroamines of the aromatic series with the dicarboxylic acids described above or with their functional derivatives, and then reducing the nitro group in known manner and, if necessary, completing the formation of the diimidazoles by heating.

A variation of the procedure consists in acylating the diamines in a first phase in one amino group only, by treating them in the presence of mineral acids with the dicarboxylic acid or a dihalide thereof, and then converting the acylated products thus obtained into the diimidazoles, for instance by boiling them with an aqueous solution of a mineral acid.

The products which are obtained by the process herein described may be designated as diimidazoles of the general formula

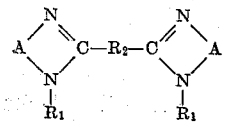

wherein A is a member selected from the group consisting of radicals of the benzene and naphthalene series in which two vicinal carbon atoms are connected to the nitrogen atoms of the imidazole rings, R₁ is a member selected from the group consisting of hydrogen, alkyl and aralkyl, and R₂ is a bivalent radical selected from the group consisting of aliphatic and heterocyclic radicals containing at least one double bond and forming with the >C=N— double bonds of the imidazole nuclei an uninterrupted series of conjugated double bonds, which products are solid substances insoluble in water but soluble to a certain degree in boiling ethyl alcohol to form solutions which show fluorescence in ultraviolet light.

The products of the invention have no dyestuff character but they possess a more or less marked fluorescence, and moreover a more or less pronounced affinity to cellulose fiber. Due to these properties they are suitable for the processing, e. g. optical bleaching, of materials, particularly of cellulose fibers, in that the products, which fluoresce in daylight or in ultra-violet light from blue to violet, when applied to the materials improve the white content in the case of undyed material and the purity of the dyeings in the case of dyed material. In the case of undyed originally yellowish material the increase of the white content may be explained by the fact that the blue to violet fluorescence of the applied compound makes the originally yellowish material appear white.

Products of the present invention which are not substituted at the imidazole nitrogen atom, are in general soluble in alcoholic alkali-hydroxide solutions, and remain in solution when diluted with water, preferably in the presence of small quantities of alkali hydroxide. The products of the present process which have been applied to cellulose fiber from these solutions show a good fastness to light and washing. For obtaining the mentioned effects it is sufficient to treat the material with very dilute solutions which may be of a strength of 0.01–1 percent for cellulose material.

The products may be used alone or mixed with auxiliary products, such as are used for the processing of fibrous materials, e. g. together with washing agents (for instance with soaps or salts of sulfonated washing agents, such as for example sulfonated benzimidazoles which are substituted at the 2-carbon atom with higher alkyl radicals, further of mono-carboxylic acid esters of the 4-sulfophthalic acid with higher fatty alcohols).

In contrast to the already known condensation products of ortho-phenylene diamine with phthalic acid the preparations of the present invention have the advantage of a higher efficacy as optical bleaching agents.

The following examples illustrate the invention, the parts being by weight unless otherwise stated:

*Example 1*

660 parts of o-phenylene diamine are heated with 116 parts of fumaric acid within 3 to 5 hours from 120 to 160° C. with exclusion of the air. As soon as the elimination of water slackens, the temperature is raised to about 190° and maintained for a short time at 190–195° until water no longer escapes. The whole is allowed to cool and the o-phenylene diamine in excess removed by extraction with alcohol, benzene or another solvent. The residue is dissolved in hot dilute hydrochloric acid, and the condensation product precipitated from the solution by means of an alkaline agent, e. g. with ammonia, filtered, and washed neutral with water. It may be further purified via the hydrochloride. It may also be obtained in a pure state via the sodium salt from an alcoholic sodium hydroxide solution.

The new product of the formula

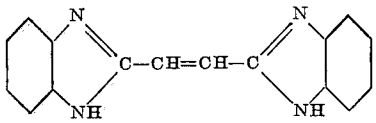

forms an almost colorless powder which is insoluble to sparingly soluble in water and in the usual organic solvents. It is taken up by dilute hot hydrochloric acid to form a weakly yellowish colored solution.

The α:β-di-[benzimidazyl-(2)]-ethylene thus obtained, dissolved for instance in an alcoholic sodium hydroxide solution, has in ultra-violet light a blue-violet fluorescence, and may be used as an optical bleaching agent having a good fastness to washing and to light. It is preferably used in such a manner that the materials, such as cellulose, are treated with liquors obtained by diluting a solution in an alcoholic sodium hydroxide solution with water.

Products of similar properties are obtained, if in place of fumaric acid, maleic acid or maleic acid anhydride are used.

Instead of fumaric acid also muconic acid may be used in a similar manner.

The condensation may also be carried out with less than the indicated quantity of o-phenylene diamine. A condensing agent, for example boric acid, may also be used for this purpose.

*Example 2*

35 parts of 1-nitro-2-aminobenzene are stirred with 250 parts of mono-chlorobenzene at 70–75° C. 20 parts of fumaric acid dichloride are then allowed to drop into this mixture, allowing the temperature to rise up to 95°. The whole is stirred at 95–100° C. until hydrochloric acid no longer escapes, cooled, the crystalline fumaric acid-di-(o-nitranilide) which has separated filtered off and washed with mono-chlorobenzene and dried.

36 parts of this dinitro compound are then added to a boiling mixture of 200 parts of glacial acetic acid and 150 parts of hydrochloric acid, whereupon 40 parts of granulated tin are added. The reaction mixture is heated until no nitro compound can be detected. It is then filtered from the undissolved tin, the filtrate poured into water, and made alkaline with sodium hydroxide solution. The separated solid powder is then filtered off, washed neutral with water, and purified by reprecipitation via the hydrochloride.

The product thus obtained of the formula

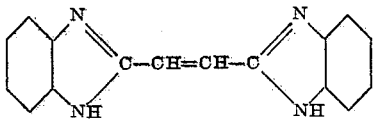

has the same properties as the product of Example 1.

*Example 3*

5.2 parts of α:β-di-[benzimidazyl-(2)]-ethylene obtained as described in Example 1 are dissolved in a mixture of 8 parts of concentrated sodium hydroxide solution and 50 parts of alcohol while heating to 70-75°. To the solution thus obtained 5.2 parts of benzyl chloride are added gradually and the reaction mixture is heated for some further time at 70-75°. It is then allowed to cool, the separated α:β-di-[N-benzyl-benzimidazyl-(2)]-ethylene filtered off, washed neutral with alcohol, and dried. The new product, which may be further purified from alcohol with addition of animal charcoal, forms thin, bright, little needles which are insoluble in water. The alcoholic solution of the new compound of the formula

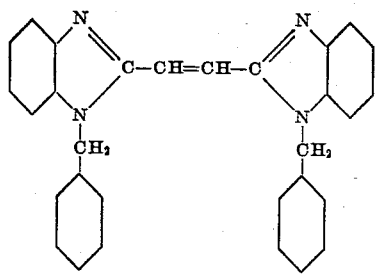

shows a violet-blue fluorescence in ultra-violet light.

*Example 4*

The operation is conducted according to the particulars of Example 1, using now, however, the isopropyl-phenylenediamine-(1:2) in place of o-phenylene diamine. This ortho-phenylene diamine iso-propylated in the nucleus may be prepared in known manner from 1:2-dichlorobenzene by isopropylating and subsequent replacement of the chlorine atoms by amino groups.

The new α:β-di-[isopropyl-benzimidazyl-(2)]-ethylene, dissolved for example in alcohol, of the formula

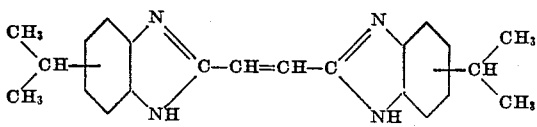

shows a blue-violet fluorescence in ultra-violet light, and may be used as an optical bleaching agent.

*Example 5*

16.6 parts of terephthalic acid are heated with 70 parts of ortho-phenylene diamine and 0.5 parts of boric acid within about 6 hours to 190° while excluding the air. The temperature of 190-195° C. is maintained until the elimination of water has ceased, whereupon the reaction mixture is allowed to cool, and the ortho-phenylene diamine in excess removed by extraction with alcohol. The residue is then dried.

The 1:4-di-[benzimidazyl-(2)]-benzene thus obtained of the formula

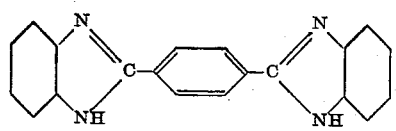

forms a bright powder which, when dissolved for instance in alcohol, shows a blue-violet fluorescence in ultra violet light.

*Example 6*

27 parts of 1-methoxy-3:4-diaminobenzene, 16.6 parts of terephthalic acid, and 1 part of boric acid are heated with exclusion of the air to 160-180° C. until the elimination of water has ceased. The reaction mixture is then allowed to cool, any terephthalic acid which may still be present removed with an aqueous solution of sodium carbonate, the residue heated with dilute hydrochloric acid, filtered, the condensation product precipitated with an aqueous ammonia solution, filtered, and dried.

The 1:4-di-[6'-methoxy-benzimidazyl-(2')]-benzene thus obtained of the formula

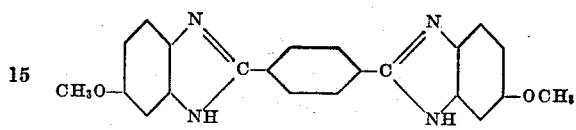

may be further purified via the hydrochloride. It forms a bright powder and shows in an alcoholic solution a bluish fluorescence in ultra-violet light.

In a similar manner 1:4-di-[6'-chloro-benzimidazyl-(2')]-benzene starting from 1-chloro-3:4-diaminobenzene and terephthalic acid may be produced.

*Example 7*

The operation is conducted according to the particulars of the first paragraph of Example 6, using as starting material however, 1:2-diaminobenzene and mono-chloro-terephthalic acid. The 1:4-di-[benzimidazyl-(2')]-2-chlorobenzene thus obtained of the formula

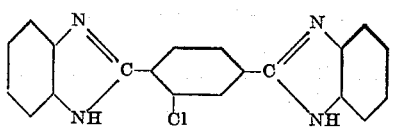

forms a bright powder which, when dissolved in alcohol, shows a violet blue fluorescence in ultra-violet light.

*Example 8*

6.2 parts of furan-2:5-dicarboxylic acid, 8.6 parts of 1:2-diaminobenzene, and 0.1 part of boric acid are heated, with exclusion of the air, to 140-150° C. until elimination of water ceases. The whole is then allowed to cool, whereupon any 1:2-diaminobenzene and furan-2:5-dicarboxylic acid present are extracted with cold dilute hydrochloric acid and sodium carbonate solution. The condensation product is then dissolved in hot dilute hydrochloric acid, and separated with an ammonia solution. It is then filtered, washed with water, and dried. The 2:5-di[benzimidazyl-(2')]-furan thus obtained of the formula

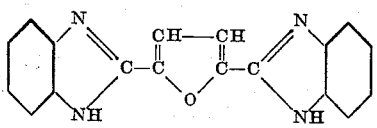

forms a bright powder which is sparingly soluble in water. It shows in alcoholic solution a blue-violet fluorescence in ultra-violet light.

*Example 9*

48 parts of 1:2-diaminonaphthalene are heated with 10 parts of fumaric acid within 2 to 4 hours to 190° C. with exclusion of the air. The temperature is maintained between 190° and 200° until the elimination of water has ceased, whereupon the whole is allowed to cool, and the 1:2-diaminonaphthalene in excess and the by-products removed by extraction with alcohol or another solvent. The new product of the formula

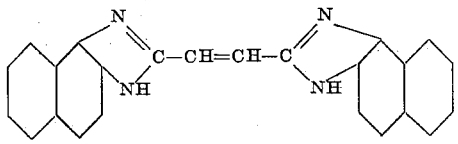

forms a weakly yellowish powder. The solution in alcohol shows in ultra-violet light an intensely violet-blue fluorescence.

Example 10

44 parts of 1:2-diaminobenzene are dissolved in 37.9 parts of hydrochloric acid of 39.2 percent strength and 150 parts of water. The whole is cooled to 0° C., and a solution of 15 parts of fumaric acid dichloride in 30 parts of benzene is allowed to slowly drop in within 3 to 4 hours and while quickly stirring at 0° C. Stirring is continued for some time without cooling, whereupon 1000 parts of water are added and the solution rendered acid to congo with hydrochloric acid. Any undissolved material is then filtered off and the new condensation product precipitated from the filtrate by means of ammonium or sodium carbonate. The fumaric acid diamide thus obtained of the formula

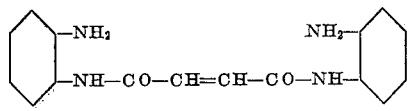

forms a bright powder. It may be further purified from alcohol.

In place of benzene also other organic solvents insoluble to sparingly soluble in water, and which do not react with fumaric acid chloride, may be used. Operation may also be conducted without benzene. In place of hydrochloric acid equimolecular quantities of hydrobromic acid may be used.

5 parts of the above described condensation product are boiled for about 18 hours in a reflux apparatus with 63 parts of hydrobromic acid of 63 percent strength and 37 parts of water. The whole is then diluted with water and the α:β-di-[benzimidazyl-(2)]-ethylene thus obtained of the formula

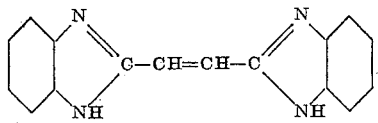

separated with ammonia, filtered off, washed neutral, and dried. It may be further purified according to the particulars of Example 1.

Hydrobromic acid having a lower or higher percentage of hydrogen bromide may also be used, and the operation may also be conducted at raised temperatures, and under pressure. In place of hydrobromic acid also hydrochloric acid may be used.

Example 11

5.1 parts of fumaric acid are heated for 24 hours in a reflux apparatus with 8.6 parts of orthophenylene-diamine and 120 parts of hydrobromic acid of 44 percent. strength. After about 4 hours a clear solution is obtained. After a further 2 hours yellowish colored thin crystals begin to separate, the quantity of which reaches its maximum at the end of 24 hours at the latest.

The reaction mixture is now refluxed for 30 minutes with 1100 parts of water and 0.5 part of blood charcoal, the yellow mass of crystals going thereby completely into solution. The solution is then filtered off from the blood charcoal and the diimidazole separated with concentrated ammonia, suction-filtered, and washed with water. The dried product thus obtained forms a bright powder having a yellowish brown color, which may be liberated from small quantities of brownish colored by-products by boiling with methyl alcohol.

In a similar manner α:β - di - [6 - chloro - benzimidazyl - (2)] - ethylene, starting from 1 - chloro - 3:4 - diaminobenzene and fumaric acid, may be produced.

Example 12

54 parts of 1 - methoxy - 3:4 - diaminobenzene are heated at 125–160° C. with exclusion of air with 10 parts of fumaric acid and 0.1 part of boric acid until elimination of water has ceased. The mixture is then allowed to cool, diluted with acetone or alcohol, filtered, and washed until colorless. The α:β - di - [6 - methoxy benzimidazyl-(2)]-ethylene thus obtained may be purified via the hydrochloride or via the sodium salt according to the particulars of Example 1. It forms a slightly yellowish colored powder, which, when dissolved in alcohol, shows a violet-blue fluorescence in ultra-violet light.

Example 13

20 parts of dimethyl sulfate are allowed to drop within 2 to 4 hours, while stirring, and at a temperature of 70–75° C. into a solution of 13 parts of α:β - di - [benzimidazyl - (2)] - ethylene in 250 parts of ethyl alcohol and 34 parts of caustic soda solution of 30 percent. strength. After cooling the α:β - di - [N - methyl - benzimidazyl - (2)] - ethylene thus obtained is filtered off, washed neutral, and dried. It forms a light yellow crystalline powder which, if necessary, may be further purified from alcohol. If heated with acetone the new product forms solutions which fluoresce strongly violet-blue.

Example 14

12 parts of 1 - methyl - 3:4 - diaminobenzene, 5 parts of fumaric acid and 100 parts of hydrobromic acid of 40 percent. strength are boiled for about 24 hours in a reflux apparatus. The reaction mixture is poured into 800 parts of water, the precipitated α:β - di - [6 - methyl - benzimidazyl - (2)] - ethylene - dibromohydrate is filtered off and washed with water. The base is obtained by dissolving in a hot, aqueous hydrobromic acid, precipitating with alkalies, for example with ammonia, filtering, washing and drying.

The new product is a bright powder; the solution in alcohol has a blue-violet fluorescence in ultra-violet light.

What we claim is:

1. Process for the manufacture of diimidazoles of the general formula

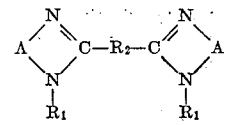

wherein A is a radical of the benzene series in which two vicinal carbon atoms are connected to the nitrogen atoms of the imidazole rings, $R_1$ is a member selected from the group consisting of hydrogen, alkyl and aralkyl, and $R_2$ is an aliphatic bivalent radical containing at least one double bond and forming with the >C=N— double bonds of the imidazole nuclei an uninterrupted series of conjugated double bonds, which comprises condensing an ortho-diamine of the benzene series in which the sum of the hydrogen atoms connected with both nitrogen atoms amounts to at least three with a member selected from the group consisting of unsaturated aliphatic dicarboxylic acids containing at least one double bond and in which the >C=O— double bonds of the carboxylic acid groups form with the double bonds, contained in the chain separating both carboxylic acid groups an uninterrupted series of conjugated double bonds, anhydrides, halides, and esters of these acids.

2. Process for the manufacture of diimidazoles of the general formula

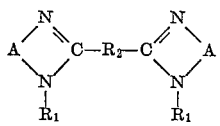

wherein A is a radical of the benzene series in which two vicinal carbon atoms are connected to the nitrogen atoms of the imidazole rings, $R_1$ is a member selected from the group consisting of hydrogen, alkyl and aralkyl, and $R_2$ is an aliphatic bivalent radical containing at least one double bond and forming with the >C=N— double bonds of the imidazole nuclei an uninterrupted series of conjugated double bonds, which comprises condensing an ortho-diamine of the benzene series in which the sum of the hydrogen atoms connected with both nitrogen atoms amounts to at least three diamine with a member selected from the group consisting of $\alpha:\beta$-unsaturated aliphatic dicarboxylic acids, anhydrides, halides, and esters of these acids.

3. Process for the manufacture of the diimidazole of the formula

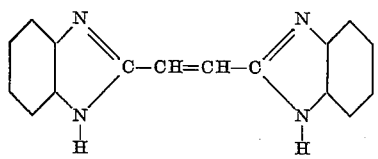

which comprises condensing ortho-phenylene diamine with fumaric acid by heating at 120 to 200° C.

4. A diimidazole of the general formula

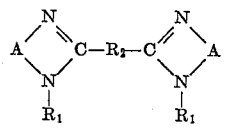

wherein A is a radical of the benzene series in which two vicinal carbon atoms are bound to the nitrogen atoms of the imidazole rings, $R_1$ is a member selected from the group consisting of hydrogen, alkyl and aralkyl, and $R_2$ is a bivalent aliphatic radical containing at least one double bond and forming with the >C=N— double bonds of the imidazole nuclei an uninterrupted series of conjugated double bonds, which product is a solid substance insoluble in water but soluble to a certain degree in boiling ethyl alcohol to form solutions which show fluorescence in the ultra-violet light.

5. The diimidazole of the formula

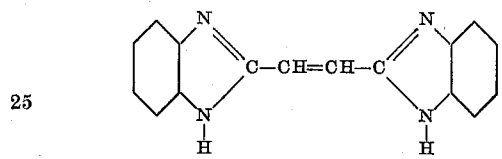

which product is a solid substance soluble in alcoholic sodium hydroxide solution to form a solution showing blue-violet fluorescence in the ultra-violet light.

6. Process for the manufacture of $\alpha:\beta$-di-[6-methyl-benzimidazole-(2)]-ethylene, which comprises condensing 1-methyl-3:4-diaminobenzene with fumaric acid by heating in aqueous hydrobromic acid.

7. Process for the manufacture of $\alpha:\beta$-di-[6-chloro-benzimidazyl-(2)]-ethylene, which comprises condensing 1-chloro-3:4-diaminobenzene with fumaric acid by heating in aqueous hydrobromic acid.

8. $\alpha:\beta$ - Di - [6 - chloro - benzimidazyl - (2)] - ethylene.

9. $\alpha:\beta$ - Di - [6 - methyl - benzimidazyl - (2)] - ethylene.

CHARLES GRAENACHER.
FRANZ ACKERMANN.

REFERENCES CITED

The following references are of record in the file of this patent:

Journal Fur Praktische Chemie, Second Series, vol. 59, pp. 255–257.

Monatshefte Fur Chemie, vol. 39, pp. 890–892.